Feb. 7, 1961     C. J. FAHLBERG     2,970,378
SLICER FOR CHEESE AND THE LIKE
Filed Jan. 8, 1960
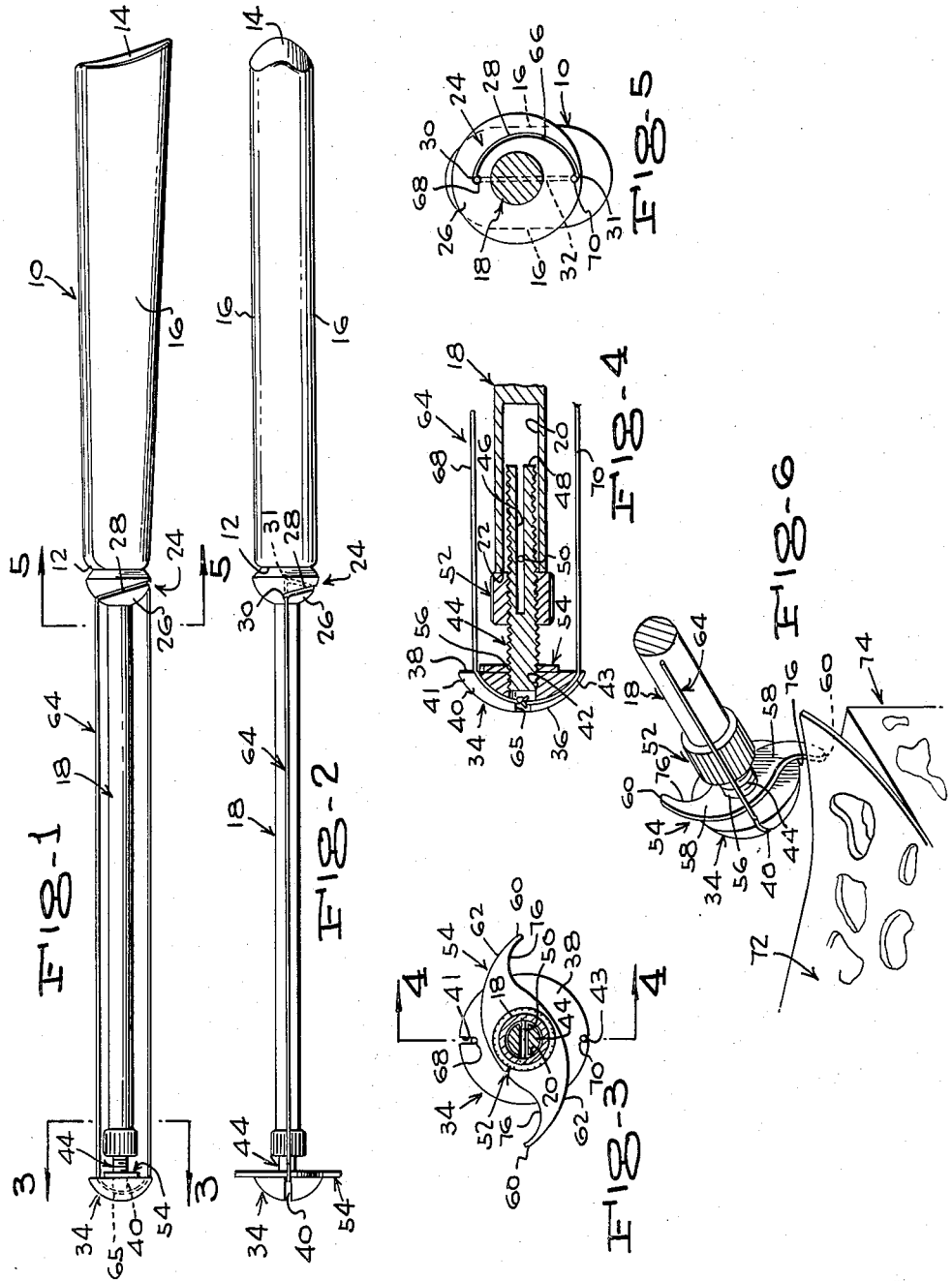
INVENTOR.
CARL J. FAHLBERG
BY
McMorrow, Berman & Davidson
ATTORNEYS

2,970,378
SLICER FOR CHEESE AND THE LIKE

Carl J. Fahlberg, 175 Grovers Ave., Bridgeport, Conn.

Filed Jan. 8, 1960, Ser. No. 1,378

4 Claims. (Cl. 30—117)

This invention relates to a novel manual slicer for cheese and the like.

The primary object of the invention is to provide an efficient, safe, and easily used device of the kind indicated, which is especially suitable for domestic kitchen and table use, and which has an elongated, relatively small cross-section form which adapts the device for small space and drawer storage, along with other similarly shaped kitchen tools, such as knives, ladles, corers, and the like, or on a table.

Another object of the invention is the provision of a simple and inexpensive device of the character indicated above which involves a longitudinal handle from which a longitudinal rod or shaft extends, and at least one and preferably two longitudinal cutter elements, of such as wire, extending along and spaced from the shaft under tension, the cutter elements, in the case of two cutter elements being involved, being spaced from different sides of the shaft at different distances therefrom, for cutting slices of different thicknesses.

A further object of the invention is to provide a device of the character indicated above wherein the shaft has on one end thereof one or more arcuate wings which reach laterally outwardly beyond the cutter element or elements for camming a cut slice from a cheese block.

Other important objects and advantageous features of the invention will be apparent from the following description and the accompanying drawings, wherein, for purposes of illustration only, a specific form of the invention is set forth in detail.

In the drawings:

Figure 1 is a side elevation of a device of the invention;

Figure 2 is an edge elevation thereof;

Figure 3 is an enlarged transverse section taken on the line 3—3 of Figure 1;

Figure 4 is a fragmentary longitudinal section taken on the line 4—4 of Figure 3;

Figure 5 is an enlarged transverse section taken on the line 5—5 of Figure 1; and, Figure 6 is a schematic perspective view, partly broken away and in section, showing the device applied to separate a cut slice from a cheese block.

Referring in detail to the drawings, wherein like numerals designate like parts throughout the several views, the illustrated device comprises a longitudinally elongated rigid handle 10, preferably of non-metallic material, and preferably tapered from its forward end 12 to its rear end 14. The handle 10 is preferably of oval cross-section, so as to provide relatively wide and substantially flat sides 16 which afford relatively large flat pressure surfaces to comfortably receive sufficient finger and hand pressure to assure easy slicing of such as relatively hard cheese having a hard skin or rind, and accurate guidance of the cutter elements in slicing operations.

Suitably strongly and rigidly anchored in the handle 10 and extending forwardly beyond the handle's forward end 12, is a preferably round rigid non-corrosive metal, straight shaft 18, which, in the illustration, is slightly longer than the handle 10, and has an axial socket 20 at and opening to its forward end 22. Fixed on or formed at a part of the shaft 18, and located at the forward end 12 of the handle 10, is an axial hemispherical knob 24, which is slightly larger in diameter than the shaft at its forward end 12. The knob 24 has a forwardly facing hemispherical surface 26, in which is formed a transverse slot 28, whose closed ends 30 and 31 are located on a diameter of the knob 24, as shown in Figures 2 and 5. As shown in Figure 5, the slot 28 is angled, relative to the axis of the knob 24, in a laterally outward and rearward direction, so that the end 30 of the slot opens through the knob surface 26 at a point forwardly of the slot end 31, and hence is closer to the shaft 18 than the slot end 31.

Mounted on the forward end of the shaft 18, for longitudinal adjustment relative thereto, is a hemispherical head 34 having a forwardly facing hemispherical surface 36 and a flat rear surface 38. The forward surface 36 is formed with a diametrical slot 40. The head 34 has a threaded axial bore 42 into which is forwardly threaded the forward end of a threaded pin 44 having a diametrical slot 46 opening to its rear end 48. The rear end portion of the pin 44 is loosely engaged in the socket 20, and a locking pin 50, suitably fixed to the shaft 18 extends through the slot 46, so as to preclude rotation of the pin 44 relative to the shaft 18.

Threaded on the pin 44 and bearing rotatably against the forward end 22 of the shaft 18 is a knurled nut 52, for adjusting the pin 44, and hence, the head 34 toward and away from the shaft 18. Circumposed centrally on the pin 44 and bearing against the flat rear surface 38 of the head 34, is a flat wing plate 54, which is suitably fixed, against rotation, to the head 34 and to the pin 44, as by welding 56. The wing plate 54 has two diametrically opposed and mutually reversed comma-shaped wings 58, whose smaller ends or tips 60 reach outwardly beyond the head 34, for substantial distances, as shown in Figures 2, 3 and 6. The wings 58 have convex arcuate cam or rolling edges 62, which are to be rolled upon a surface, such as a cutting board, as hereinafter described, and the wings are at right angles to the bottom 32 of the slot 28 in the knob 24, as shown in Figure 3.

The cutting component of the device, generally designated 64, preferably comprises a single length of fine non-corrosive wire, such as piano wire, which has its midlength portion 66 trained through and engaged with the bottom 32 of the retaining slot 28 in the knob 24. The resultant wire flights 68 and 70, which are cutter elements, are brought forwardly from the slot ends 30 and 31, respectively, along related sides of the shaft 18 and through related ends 41 and 43 of the head slot 40, wherein the flight ends are suitably secured together, as by being tied, as shown in Figure 4, in an enlarged axial bore 65 opening into the center of the slot 40.

As shown in Figures 3 and 4, the head slot end 41 is radially deeper than the slot end 43, to the same degree that the knob slot end 30 is nearer to the axis of the rod 18 than the knob slot end 31, so that the cutter elements 68 and 70 are spaced parallel to the shaft 18, with the element 68 closer to the shaft than the cutter element 70. The nut 52 is then rotated in a direction to force the pin 44, and hence the head 34, forwardly relative to the shaft 18, so as to tension the cutter elements 68 and 70.

A slice 72 is cut from a cheese block 74 by holding one of the cutter elements against the side of the block, with the shaft 18 in contact with the top of the block, and forcing and guiding the cutter element through the block by means of the handle 10, and shaft 18 thus serving as a slice thickness guage and assuring the cutting of a slice of uniform thickness. A thinner slice can be cut by merely twisting the device so that the shaft 18 and the cutting wire 64 has less clearance between them.

Should a slice stick between the shaft 18 and a cutter element, the slice can be readily dislodged by laying the slice, together with the slicer device, upon any suitable surface, and rotating the device on its axis, with the rolling edge 62 of a related wing 58 bearing upon such surface. Further, as illustrated in Figure 6, the slicer device can be used to easily separate a slice 72 cut from a cheese block 74, without the use of the fingers or another implement, by applying the concave edge 76 of one of the wings to the underside of the slice 72, the smaller end 76 of the wing being first inserted between the slice and the block, and lifting the slice by rotating the device on its axis, in a clockwise direction, in the case of Figure 6, so as to cam the slice upwardly away from the block.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A slicer comprising a handle, a longitudinally elongated shaft having a free forward end and a rear end fixed to the handle, a knob fixed on the shaft adjacent to the handle, said knob being larger in diameter than the shaft, a longitudinally adjustable head assembly mounted on the shaft at its forward end, and a cutter component comprising a length of wire having a midlength portion secured to the knob and extending crosswise of the knob, said wire having first and second flights extending forwardly along and parallel spaced from different sides of the shaft, said flights having forward ends secured to the head assembly at opposite sides thereof, said head assembly comprising a head to which the flights are secured, a threaded pin fixed to and extending rearwardly from the head, said shaft having a threaded socket in its forward end in which said pin is freely engaged, key means precluding rotation of the pin in said socket, and a nut threaded on the pin and bearing rotatably against the forward end of the shaft.

2. A slicer comprising a handle, a longitudinally elongated shaft having a free forward end and a rear end fixed to the handle, a knob fixed on the shaft adjacent to the handle, said knob being larger in diameter than the shaft, a longitudinally adjustable head assembly mounted on the shaft at its forward end, and a cutter component comprising a length of wire having a midlength portion secured to the knob and extending crosswise of the knob, said wire having first and second flights extending forwardly along and parallel spaced from different sides of the shaft, said flights having forward ends secured to the head assembly at opposite sides thereof, said head assembly comprising a head to which the flights are secured, a threaded pin fixed to and extending rearwardly from the head, said shaft having a threaded socket in its forward end in which said pin is freely engaged, key means precluding rotation of the pin in said socket, and a nut threaded on the pin and bearing rotatably against the forward end of the shaft, said head having a forward surface having a transverse slot therein in which the forward ends of said flights are engaged, said knob having a transverse slot opening to opposite sides thereof in which said midlength portion of the wire is securably engaged.

3. A slicer comprising a handle, a longitudinally elongated shaft having a free forward end and a rear end fixed to the handle, a knob fixed on the shaft adjacent to the handle, said knob being larger in diameter than the shaft, a longitudinally adjustable head assembly mounted on the shaft at its forward end, and a cutter component comprising a length of wire having a midlength portion secured to the knob, said wire being first and second flights extending forwardly from opposite sides of the knob and along and parallel spaced from different sides of the shaft, said flights having forward ends secured to opposite sides of the head assembly, and a diametrically elongated wing plate fixedly mounted on the shaft behind the head, said wing plate having reversed comma-shaped wings having tips at their outer ends located between the first and second wire flights and reaching outwardly beyond the periphery of the head and said flights.

4. A slicer comprising a handle, a longitudinally elongated shaft having a free forward end and a rear end fixed to the handle, a knob fixed on the shaft adjacent to the handle, said knob being larger in diameter than the shaft, a longitudinally adjustable head assembly mounted on the shaft at its forward end, and a cutter component comprising a length of wire having a midlength portion secured to the knob, said wire being first and second flights extending forwardly from opposite sides of the knob and along and parallel spaced from different sides of the shaft, said flights having forward ends secured to opposite sides of the head assembly, and a diametrically elongated wing plate fixedly mounted on the shaft behind the head, said wing plate having reversed comma-shaped wings having tips at their outer ends located between the first and second wire flights and reaching outwardly beyond the periphery of the head and said flights, said wings having arcuate convex edges, and concave arcuate edges opposed to the convex edges.

References Cited in the file of this patent

UNITED STATES PATENTS

| | | |
|---|---|---|
| 1,540,246 | Blassie | June 2, 1925 |
| 1,881,623 | Jassoy | Oct. 11, 1932 |
| 2,533,682 | Arenskov | Dec. 12, 1950 |

FOREIGN PATENTS

| | | |
|---|---|---|
| 8,073 | Great Britain | Apr. 5, 1913 |